000
United States Patent [19]

Laughlin

[11] 4,377,401
[45] Mar. 22, 1983

[54] ROTARY FILTER FOR FIBER PRODUCT

[76] Inventor: Sidney J. Laughlin, P.O. Box 218, Rogers, Tex. 76596

[21] Appl. No.: 273,360

[22] Filed: Jun. 15, 1981

[51] Int. Cl.³ .............................................. B01D 46/04
[52] U.S. Cl. ........................................ 55/290; 55/302; 65/10; 209/23; 209/31; 209/35
[58] Field of Search ............... 65/10; 55/96, 290, 302, 55/293, 352, 405; 209/23, 26, 27, 35, 31, 137, 139 R

[56] References Cited

U.S. PATENT DOCUMENTS

| | | | |
|---|---|---|---|
| 3,472,002 | 10/1969 | Brown et al. | 55/272 |
| 3,499,267 | 1/1970 | King, Jr. et al. | 55/290 |
| 3,864,107 | 2/1975 | Baigas, Jr. | 55/290 |
| 4,193,779 | 3/1980 | Hencke | 55/290 |
| 4,253,855 | 3/1981 | Jackson et al. | 55/290 |
| 4,268,294 | 5/1981 | Laughlin et al. | 65/10 |

Primary Examiner—Robert L. Lindsay, Jr.
Attorney, Agent, or Firm—Hubbard, Thurman, Turner & Tucker

[57] ABSTRACT

Method and filter apparatus for extracting entrained lint particles from an effluent air stream prior to discharge into the atmosphere. The filter apparatus and method are used in combination with a vertical settling chamber for separating relatively dense fiber product from airborne lint entrained in a product stream. The filter apparatus includes a housing forming an air stream inlet, a product discharge outlet and a clean air outlet. A rotatable screen is interposed between the air stream inlet and the clean air outlet for collecting the entrained lint on the screen as the effluent air stream flows through the screen for discharge into the atmosphere. Bulk fiber product which settles to the bottom of the chamber is discharged through a rotary valve in the product discharge outlet. The accumulated lint deposit is presented to the product discharge outlet as the screen turns. Compressed air is discharged through the screen from inside to outside which cleans the accumulated lint deposit from the rotating screen. In a preferred embodiment, the rotary screen comprises a drum having a cylindrical screen surface for accumulating the lint deposit, with both ends of the drum being rotatably sealed against the settling chamber housing by a resilient sealing member.

1 Claim, 4 Drawing Figures

ROTARY FILTER FOR FIBER PRODUCT

BACKGROUND OF THE INVENTION

1. Field of the Invention

The present invention relates generally to mineral fiber production, and in particular to method and apparatus for limiting the emission of airborne by-product material which is incidental to the manufacture of fiber product.

2. Description of the Prior Art

In the art of producing mineral fiber, a spinning unit is utilized for fiberizing molten slag with air or steam. The fiber is conveyed through a blow chamber or collection chamber by down draft fans to a conveyer belt where it is removed by various methods and put into a conventional bagger. A limitation of this arrangement is that it is not a closed system, and the lint or airborne flywool by-product cannot be completely contained, thereby allowing a large quantity of fugitive airborne particles to be emitted into the atmosphere and contributing to pollution of the environment. Because of its damaging ecological effect, this airborne, fugitive fly by-product must be captured or recovered before the air stream, in which it is entrained, is discharged into the atmosphere.

The uncontrolled emission of these airborne particles into the atmosphere presents formidable problems because of the increasing emphasis on environmental quality which has led to surveillance and regulation by federal and local authorities. Government legislation no longer permits uncontrolled emissions from mineral fiber plants. Clean air legislation regulates the acceptable amount of particulate material and the constituency of effluent gases from such operations. Failure to abide by the regulatory acts can result in penalties as well as the imposition of permanent injunctions against such operation. Further, new operators must demonstrate in pilot operations that such emissions fall below the established minimum level before a permit for continuous full scale operation will be granted.

In view of the damaging effect of uncontrolled emissions on the ecology, the increasingly tighter controls imposed on such operations by federal and local authorities, and in view of the increasing demand for mineral fiber product, there is an urgent need for new and improved equipment which limit such emissions to safe levels while allowing the mineral fiber process to be operated efficiently on a large scale to meet product demand.

OBJECTS OF THE INVENTION

It is, therefore, the principal object of the present invention to provide a filter apparatus and method for extracting entrained lint particles from an effluent air stream prior to discharge into the atmosphere.

A related object of the invention is to provide a self-cleaning, rotary filter for use in combination with a vertical settling chamber in which airborne lint particles entrained within an effluent stream are efficiently removed from the stream prior to discharge into the atmosphere, and thereafter accumulated with the bulk fiber product.

Yet another object of the invention is to provide a closed system for producing mineral fiber product in which airborne lint particles entrained with the product stream are carefully controlled at all times, with the fiber product and the effluent air stream carrying the product being discharged with virtually no emission of fugitive lint particles.

SUMMARY OF THE INVENTION

The foregoing objects are provided by filter apparatus and method which are used in combination with a vertical settling chamber for separating relatively dense fiber product from airborne lint entrained in a product stream. The filter apparatus includes a housing forming an air stream inlet, a fiber product discharge outlet and a clean air outlet. A rotatable screen is interposed between the air stream inlet and the clean air outlet whereby the entrained lint is accumulated on the screen as the effluent air stream flows through the screen for discharge into the atmosphere. Bulk fiber product which settles to the bottom of the chamber is discharged through the product discharge outlet. The accumulated lint deposit is presented to the product discharge outlet as the screen turns. Compressed air is discharged through the screen from inside to outside which cleans the accumulated lint deposit from the rotating screen.

In a preferred embodiment, the rotating screen comprises a drum having a cylindrical screen surface for accumulating a lint deposit, with both ends of the drum being sealed against the settling chamber housing by a resilient, rotary sealing member. The fiber product is discharged from the settling chamber through a rotary lock valve. The product stream is completely enclosed at all times and is conveyed through conduits which are maintained at a pressure below atmospheric, thereby inhibiting the emission of lint and other particulate material.

The novel features which characterize the invention are defined by the appended claims. The foregoing and other objects, advantages, and features of the invention will hereafter appear, and for purposes of illustration of the invention, but not of limitation, an exemplary embodiment of the invention is shown in the appended drawings.

DETAILED DESCRIPTION OF THE PREFERRED EMBODIMENT

Figure 1:
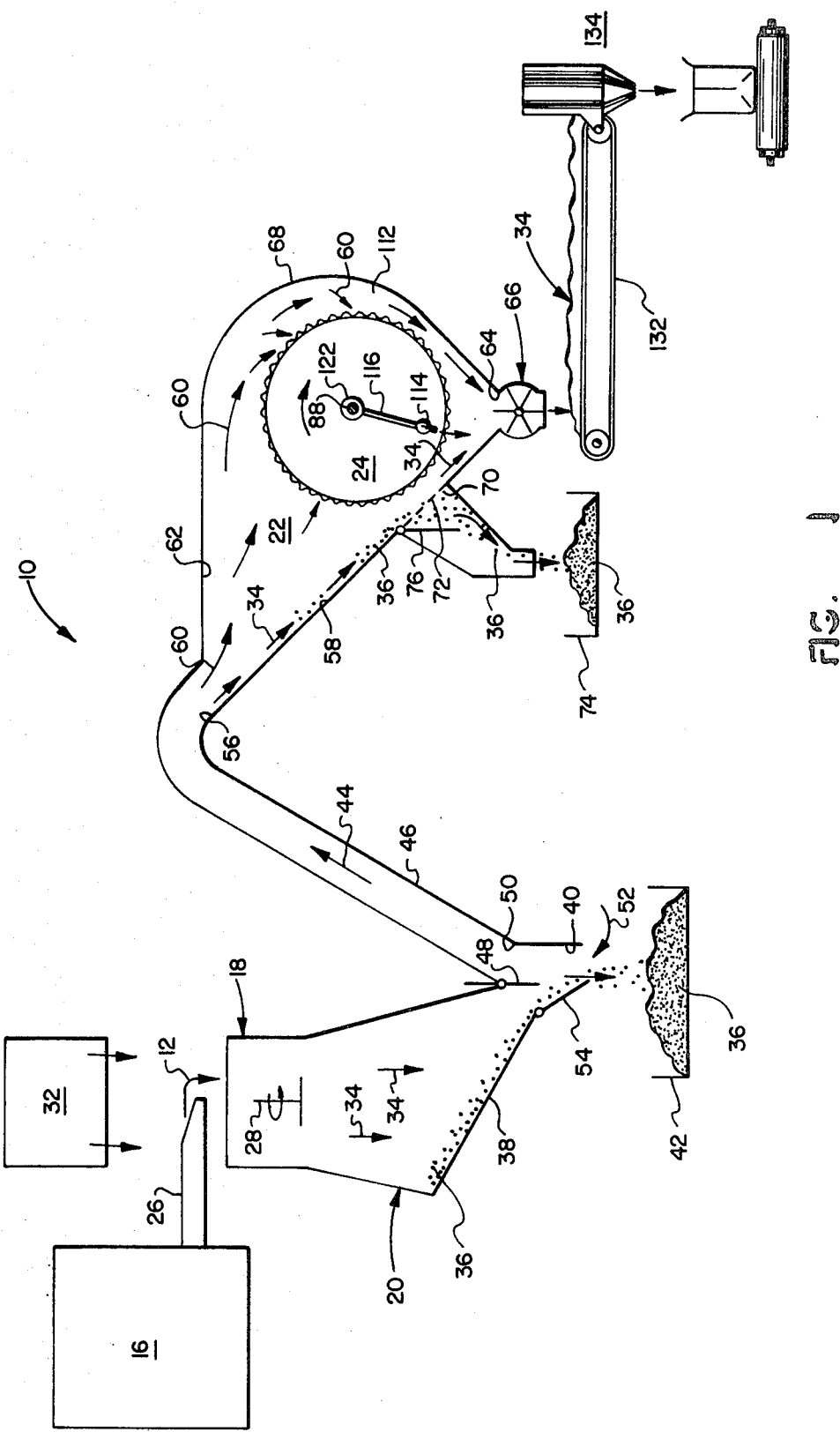
FIG. 1 is a schematic view of a mineral fiber manufacturing system constructed according to the teachings of the invention.

In the description which follows, like parts are marked throughout the specification and drawings with the same reference numerals, respectively. The drawings are not necessarily to scale and in some instances portions have been exaggerated in order to more clearly depict certain features of the invention.

Figure 2:
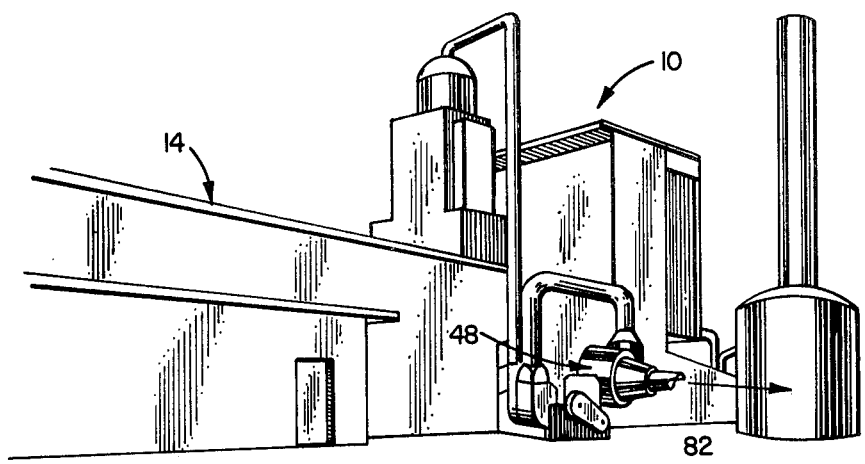
FIG. 2 is a perspective view of a mineral fiber manufacturing plant incorporating the system shown in FIG. 1.

Referring now to FIGS. 1 and 2 of the drawing, a system 10 for producing mineral fiber product from a stream of molten slag 12 in a plant enclosure 14 is disclosed. The system includes as major components a cupola 16, an attenuator 18 for elongating the slag to produce the mineral fiber product, a cone 20 for precooling the fiber product, a settling chamber 22 for settling out the relatively dense fiber product, and a rotary filter assembly 24 for recovering the airborne flywool entrained in air discharged from the settling chamber, thereby inhibiting the release of fugitive flywool particles into the atmosphere.

Molten slag 12 is tapped from the cupola 16 through a spout 26. A stream of the molten slag 12 issues through the spout into the open top of the slag attenuator 18. The stream of molten slag falls onto the rotating blades of a spinner 28. At the same time, back pressure air flow indicated by the arrows 30 is directed across the spinner by an air ring 32. In response to the resultant forces imparted to the slag by the spinner 28 and the back pressure air flow 30, the stream of slag 12 is divided into multiple fiber streams 34 and are projected at a high velocity into a water cooled cone 20. As the finely divided streams of slag accelerate through the cone 20, the leading mass cools and solidifies as "shot" at the forward end of the fiber trailing behind it. This produces the desired elongated fiber configuration. This fiber elongating process is generally referred to herein as "attenuation".

It should be understood that other attenuating methods may be used to good advantage to produce the fiber product. For example, the slag may be attenuated solely by the action of a centrifugal force as imparted by the spinner 28 or solely by an aerodynamic force, as imparted by the air ring 32, or by a combination of the two as illustrated in FIG. 1. The aerodynamic force may be applied to the slag by high speed, high temperature gaseous jets of heated air or other gases, for example steam.

The "shot" produced by the attenuation of the slag comprises small irregular, but often spherical granules or nodules 36 of molten slag or rock. Because the shot is detrimental to the quality of the mineral fiber produced, it is removed from the product flow by allowing it to fall under the influence of gravity along a slide 38 where it is discharged through a damper opening 40 into a shot bin 42.

As a result of the attenuation process, a large amount of airborne mineral wool particles are created which do not initially agglomerate with the bulk mineral fiber. Because of its damaging ecological effect, this airborne, fugitive fly by-product must be captured or recovered before the air stream in which it is entrained is discharged into the atmosphere.

Figure 3:
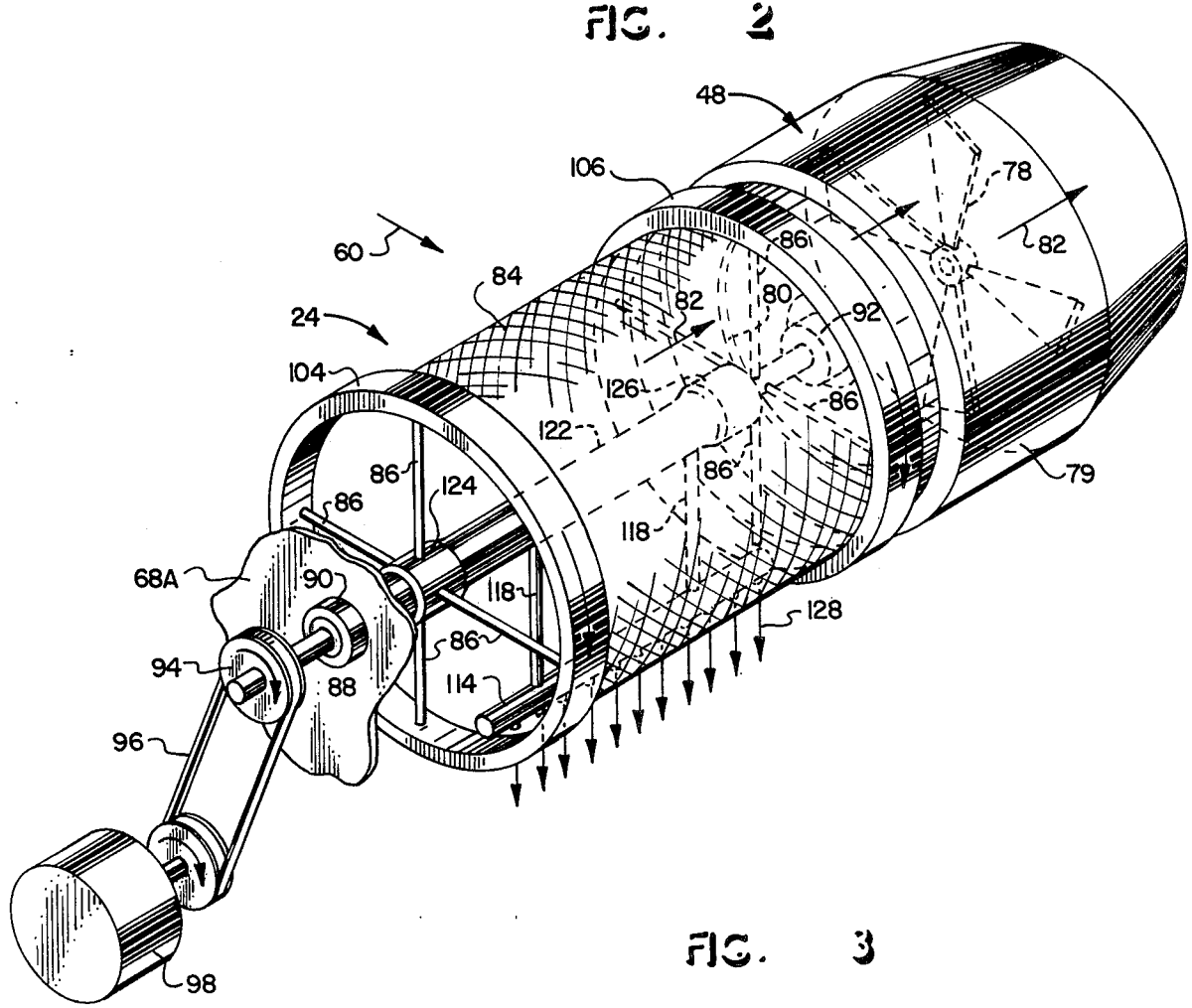
FIG. 3 is a perspective, operational view of a rotary screen filter assembly; and, FIG. 4 is a side elevation view, partially in section, of the rotary filter assembly shown in FIG. 3.

The bulk mineral fiber product and the mineral wool fly by-product are referred to collectively as rough product designated by the arrow 34, and the effluent air stream in which they are entrained is designated by the arrow 44. The rough product combination 34 is conveyed to the settling chamber 22 through a collector conduit 46. A draft is induced through the collector conduit 46 by a fan blower assembly 48 (FIG. 3). The rate at which the rough product 34 is withdrawn from the cooling cone 20 is controlled by a slide damper 48 located at the inlet port 50 to the collector conduit 48. Cooling air 52 is admitted through the shot discharge opening and inlet port 40, and a damper 54 mounted in the shot discharge opening and inlet port 40 controls the volume and velocity of cooling air flow.

The bulk fiber product undergoes further cooling as it moves upwardly through the collector conduit 46. The collector conduit 46 is arranged to discharge the entrained bulk fiber product 34 and flywool particles 60 through an air stream inlet 56 at the upper level of the settling chamber 22. The entrained materials are preferably discharged tangentially along the lower inner wall 58 of the settling chamber. Because the fiber product 34 is relatively dense, it moves downwardly along the inner wall 58 as indicated by the arrows 34 to the bottom of the chamber while the airborne fugitive flywool particles 60, being relatively less dense, travel through the interior of the chamber 22 bounded by the upper wall 62. The bulk fiber product 34 accumulates in the bottom of the chamber and is discharged through a product outlet 64 and a rotary valve 66 for further processing.

Figure 4:
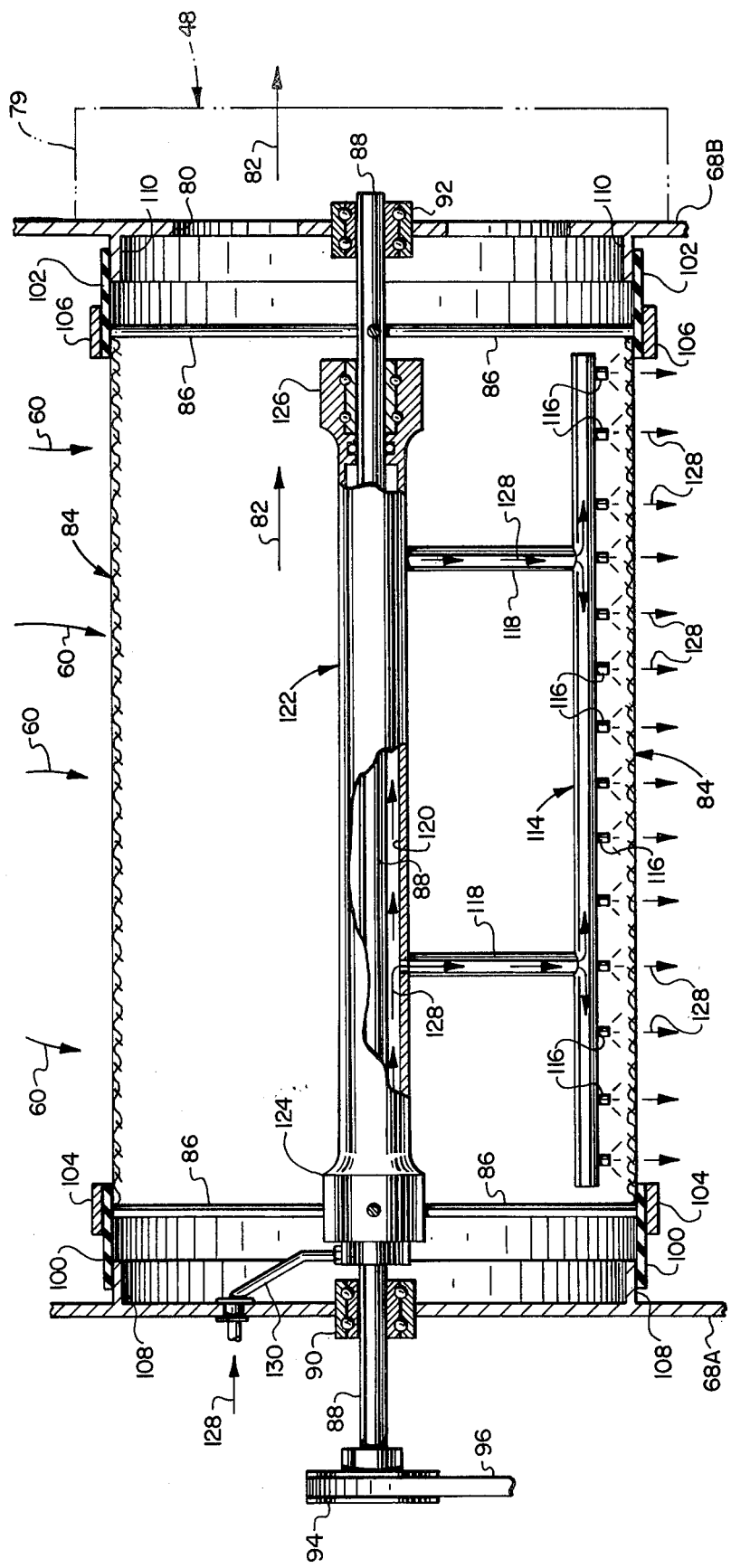

The airborne lint particles 60 travel generally upwardly through the interior of the chamber 22 and around the annulus between the rotary filter 24 and the curved settling chamber housing 68. The chamber 22 is complete enclosed by the housing 68, including side panels 68A, 68B as illustrated in FIG. 4.

The lower chamber housing panel 58 is fitted with a shot discharge opening 70 which is covered with a coarse screen 72. Shot 36 falls along the lower panel 58 and through the screen 72 into a shot bin 74. The opening 70 is partially closed by a damper 76 to limit the amount of air drawn through the opening. Bulk fiber product 36 falls downwardly over the screen to the bottom of the settling chamber into the rotary valve 66. Thus it will be seen that the entire system, including the interior of the settling chamber 22, is maintained at a lower than atmospheric pressure as air is pulled through the system by a suction fan 78 which is coupled to the clean air outlet 80 in the chamber side panel 68B (FIGS. 3 and 4). The suction fan 78 is enclosed within a shroud 79 which is sealed against the settling chamber side panel 68B around the clean air outlet 80. As the effluent air stream passes through the rotary filter 24, airborne lint is trapped on the surface of the filter and clean air, illustrated by the arrow 82, is discharged into the environment.

The preferred construction for the rotary filter 24 will now be described. Referring to FIGS. 1, 3 and 4, the filter assembly 24 comprises a cylindrical screen 84 concentrically supported by spokes 86 about a horizontal shaft 88. The shaft 88 is journalled for rotation on conventional bearing assemblies 90, 92 at each end. A pulley 94 is secured to one end of the shaft 88 and is driven in rotation by a belt 96 and an electrical motor 98.

Each end of the cylindrical screen 84 is sealed by resilient collars 100, 102, respectively. The collars 100, 102 are preferably made of a durable, flexible material such as Teflon, Hypalon or synthetic rubber. Each collar is securely fastened to the end of the drum assembly by clamping bands 104, 106, respectively. The resilient collars 100, 102 are disposed in slidable, sealing engagement with annular flanges 108, 110, respectively. The collars are mounted on the settling chamber housing panel 68A, 68B, respectively, in alignment with the rotary drum and axially spaced from the ends of the drum. The air gaps between the flanges and the drum are sealed by the resilient collars 100, 102, so that the effluent air stream carrying the airborne lint 60 must pass through the screen 84 before it is discharged into the environment. The fugitive flywool particles 60 are accumulated as a lint deposit on the surface of the screen 84 as the effluent air stream passes through the screen.

The settling chamber housing 68 outwardly surrounds the rotary screen drum 24 and defines a generally annular lint accumulation zone 112 through which the lint particles travel. The rotatable screen 84 is interposed in the flow path of the effluent air stream whereby the fugitive flywool particles entrained in the stream are accumulated on the screen surface as the effluent air stream flows through the screen and through the clean air outlet 80. The fugitive particles are accumulated as a lint deposit on the surface of the screen, and the deposit is presented to the discharge outlet 64 as the screen turns through the annular lint accumulation zone.

The screen 84 is cleaned continuously by multiple jets of high pressure air discharged through an air distribution bar 114. Jets of compressed air are discharged through a plurality of nipples 116 coupled to the distribution bar 114. The distribution bar is supported in a fixed position within the rotatable drum screen 84 by stand-off conduits 118. The stand-off conduits 118 mechanically support the air distribution bar 114, and connect it in fluid communication with a high pressure plenum chamber 120 formed by a sealed tube 122. The sealed tube 122 is supported in concentric, spaced relation about the shaft 88, and is coupled thereto by rotary fluid seals 124, 126, respectively. According to this arrangement, the screen drum 84 is free to rotate with respect to the fixed distribution bar 114, whereby the accumulated lint deposit is forcibly blown away from the screen by the movement of high pressure air from the inside of the screen to the outside as indicated by the arrows 128.

A supply conduit 130 is coupled to the plenum tube 122 for conveying pressurized air 128 from an external source (not shown) to the plenum chamber 120. According to this arrangement, the fugitive flywool particles 60 are contained within the settling chamber 22 until they are accumulated onto the screen 84 in a mass large enough to settle out for discharge through the rotary valve 66. Moreover, it will be appreciated that as the larger fugitive particles are deposited over the screen surface, that the lint deposit prevents penetration of the screen by extremely small fly particles. Thus, particle emissions through the clean air outlet 80 is limited to an extremely low level.

The rotary valve 66 discharges bulk fiber product together with accumulated lint deposit onto a conveyor 132 which carries the fiber product to an automatic bagging station 134 for further processing.

The invention may be embodied in other specific forms without departing from the spirit or essential characteristics thereof. For example, although the filter is preferably embodied in the form of a cylindrical screen, other rotary screen configurations may be used to good advantage with only slight system modifications. Therefore, the present embodiment should be considered in all respects as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by U.S. Letters Patent is:

1. A rotary filter for use in a processing system for fiber product or the like for removing airborne lint from an air stream, agglomerating the lint and delivering it to a discharge outlet for further processing, comprising, in combination:

settling means having a housing enclosing a settling chamber and having an air stream inlet, a lint discharge outlet and a clean air outlet;

a rotor shaft mounted for rotation within said chamber;

a rotatable screen drum mounted on said rotor shaft for rotation within the settling chamber and interposed between the air stream inlet and the clean air outlet whereby the entrained lint is accumulated on the screen as the air stream flows through the screen and out of the clean air outlet, and whereby the accumulated lint deposit is presented to the lint discharge outlet as the screen turns;

means coupled to said settling chamber for inducing the flow of air through the air stream inlet and out of the clean air outlet;

means forming a rotatable seal between said drum and said settling chamber housing;

means coupled to said drum for removing accumulated lint from said screen, said lint removing means including an air distribution bar disposed within said drum, said distribution bar having a plurality of air jet nozzles for directing pressurized air through said screen;

means coupled in fluid communication with said distribution bar for conveying pressurized air to said bar from an external source, said pressurized air means including a tube defining an air supply plenum disposed about said rotor shaft;

means defining a rotary fluid seal between said shaft and said plenum tube; and, a stand-off conduit mechanically supporting said distribution bar adjacent said screen drum and connecting said distribution bar in fluid communication with said air supply plenum.

* * * * *